United States Patent
Kingham et al.

(10) Patent No.: US 10,636,528 B2
(45) Date of Patent: Apr. 28, 2020

(54) SHIELDING MATERIALS FOR FUSION REACTORS

(71) Applicant: Tokamak Energy Ltd, Oxfordshire (GB)

(72) Inventors: David Kingham, Oxfordshire (GB); George Smith, Oxfordshire (GB)

(73) Assignee: TOKAMAK ENERGY LTD, Abingdon Oxfordshire (GB)

( * ) Notice: Subject to any disclaimer, the term of this patent is extended or adjusted under 35 U.S.C. 154(b) by 324 days.

(21) Appl. No.: 15/315,211

(22) PCT Filed: Jul. 7, 2015

(86) PCT No.: PCT/GB2015/051961
§ 371 (c)(1),
(2) Date: Nov. 30, 2016

(87) PCT Pub. No.: WO2016/009176
PCT Pub. Date: Jan. 21, 2016

(65) Prior Publication Data
US 2017/0186502 A1    Jun. 29, 2017

(30) Foreign Application Priority Data

Jul. 15, 2014 (GB) .................................. 1412540.5
Mar. 26, 2015 (GB) .................................. 1505156.8

(51) Int. Cl.
*G21B 1/13* (2006.01)
*G21F 1/08* (2006.01)
(Continued)

(52) U.S. Cl.
CPC .............. *G21B 1/13* (2013.01); *C22C 29/005* (2013.01); *C22C 29/02* (2013.01); *C22C 29/14* (2013.01);
(Continued)

(58) Field of Classification Search
CPC ......... G21B 1/13; C22C 29/005; C22C 29/02; C22C 29/08; C22C 29/10
See application file for complete search history.

(56) References Cited

U.S. PATENT DOCUMENTS 6,250,855 B1 * 6/2001 Persson .................... C22C 29/08
                                                          407/118
9,472,309 B1 * 10/2016 Weaver ..................... G21B 1/13
(Continued)

FOREIGN PATENT DOCUMENTS

CA    2700614 A1    10/2011
GB    2512983 A  *  10/2014    ............. C22C 26/00
(Continued)

OTHER PUBLICATIONS

Chinese Office Action for Corresponding Application No. 2015800306429; dated Jul. 3, 2017.
(Continued)

*Primary Examiner* — Lily C Garner
(74) *Attorney, Agent, or Firm* — Cantor Colburn LLP

(57) ABSTRACT

There is described neutron shielding for a nuclear fusion reactor. The neutron shielding includes a cemented carbide or boride comprising a binder and an aggregate, the aggregate comprising particles of a carbide or boride compound.

4 Claims, 2 Drawing Sheets

(51) Int. Cl.
  *C22C 29/00* (2006.01)
  *C22C 29/02* (2006.01)
  *C22C 29/14* (2006.01)
  *G21B 1/05* (2006.01)
  *C22C 29/08* (2006.01)
  *C22C 29/10* (2006.01)

(52) U.S. Cl.
  CPC ............... *G21B 1/057* (2013.01); *G21F 1/08* (2013.01); *C22C 29/08* (2013.01); *C22C 29/10* (2013.01); *Y02E 30/122* (2013.01); *Y02E 30/128* (2013.01)

(56) References Cited

U.S. PATENT DOCUMENTS

| | | | | |
|---|---|---|---|---|
| 2012/0114960 | A1* | 5/2012 | Takesawa | C22C 1/051 428/565 |
| 2013/0089171 | A1* | 4/2013 | Sykes | G21B 1/05 376/133 |

FOREIGN PATENT DOCUMENTS

| | | |
|---|---|---|
| JP | 53124102 A | 10/1978 |
| JP | 5916944 A | 1/1984 |
| JP | 62263980 A | 11/1987 |
| JP | 05246761 A | 9/1993 |
| JP | 2001081526 A * | 3/2001 |
| JP | 2006145421 A | 6/2006 |
| JP | 2014122375 A | 7/2014 |
| RU | 2036977 C1 | 6/1995 |
| RU | 2059298 C1 | 4/1996 |
| RU | 2107049 C1 | 3/1998 |
| RU | 2211878 C2 | 9/2003 |
| RU | 2325459 C2 | 5/2008 |
| RU | 2442620 C2 | 2/2012 |
| RU | 2499069 C2 | 11/2013 |
| RU | 2521937 C2 | 7/2014 |
| RU | 2538410 C1 | 1/2015 |
| WO | 2013030554 A1 | 3/2013 |
| WO | 2014119803 A1 | 7/2014 |

OTHER PUBLICATIONS

European Examination Report for corresponding application 15717212.3; dated Oct. 23, 2017.
British Search Report for corresponding application GB1412540.5; dated Feb. 25, 2015.
International Search Report for corresponding application PCT/GB2015/051961 filed Jul. 7, 2015; dated Oct. 1 2015.
Pingping Zhang, "Mechanical Properties of Tantalum-Tungsten Interlayer Between Tungsten Tile and Thimble to Prevent Helium Leak from He-cooled Diverter", Journal of Physics: Conference Series 419, Mar. 28 3013, p. 12025, XP020243503.
Written Opinion for corresponding application PCT/GB2015/051961 filed Jul. 7, 2015; dated Oct. 1, 2015.
Russian Office Action for corresponding application 2017102925/07 filed Jul. 7, 2015; dated Dec. 26, 2018; 4 pages.
Japanese Office Action for corresponding application No. 2017-501694; dated Apr. 19, 2019; 12 pages.

* cited by examiner

SHIELDING MATERIALS FOR FUSION REACTORS

TECHNICAL FIELD

The present invention relates to neutron shielding materials for fusion reactors. In particular, though not exclusively, the invention relates to shielding for use in a compact spherical tokamak reactor.

BACKGROUND

The challenge of producing fusion power is hugely complex. Fusion neutrons are produced when a deuterium-tritium (D-T) or deuterium-deuterium (D-D) plasma becomes very hot so that the nuclei fuse together, releasing energetic neutrons. To date, the most promising way of achieving this is to use a tokamak; in the conventional tokamak approach to fusion (as embodied by ITER), the plasma needs to have high confinement time, high temperature, and high density to optimise this process.

A tokamak features a combination of strong toroidal magnetic field $B_T$, high plasma current $I_P$ and usually a large plasma volume and significant auxiliary heating, to provide a hot stable plasma so that fusion can occur. The auxiliary heating (for example via tens of megawatts of neutral beam injection of high energy H, D or T) is necessary to increase the temperature to the sufficiently high values required for nuclear fusion to occur, and/or to maintain the plasma current.

The problem is that, because of the large size, large magnetic fields, and high plasma currents generally required, build costs and running costs are high and the engineering has to be robust to cope with the large stored energies present, both in the magnet systems and in the plasma, which has a habit of 'disrupting'—mega-ampere currents reducing to zero in a few thousandths of a second in a violent instability.

The situation can be improved by contracting the donut-shaped torus of a conventional tokamak to its limit, having the appearance of a cored apple—the 'spherical' tokamak (ST). The first realisation of this concept in the START tokamak at Culham demonstrated a huge increase in efficiency—the magnetic field required to contain a hot plasma can be reduced by a factor of 10. In addition, plasma stability is improved, and build costs reduced.

WO 2013/030554 describes a compact spherical tokamak for use as a neutron source or energy source. An important consideration in the design of spherical tokamaks is the protection of reactor components from the high neutron flux generated by the fusion reaction. This is of particular importance on small tokamaks as the neutron flux (i.e. neutron flow per unit area) will in general be higher due to the smaller surface area-to-volume ratio of the plasma vessel.

The present application is based on a very compact form of the tokamak, and employs a range of innovative features, including use of High Temperature Superconducting magnets. The 'Efficient Compact Fusion Reactor' (ECFR) is intended to provide a compact fusion power plant. FIG. 1 is a schematic diagram of such a reactor. The plasma (11) is contained within a vacuum vessel (12) by the magnetic fields generated by a toroidal field coil (13) and a poloidal field coil (not shown). The toroidal field coil runs down a central column (14) in the centre of the plasma chamber.

A drawback of the ST is that the limited space in the central column prohibits installation of the substantial shielding necessary to protect the central windings in a neutron environment—so conventional toroidal field windings, and conventional central solenoids (used to induce and maintain the plasma currents) are not practical. Although power plants based on the ST have been designed (using solid copper centre posts with limited shielding, the post being changed every year or so when damaged by neutrons), these have high energy dissipation in the centre column due to the relatively high resistivity of warm copper, requiring a large device for electricity production to become economical.

Superconducting materials may be used for the central core, but such materials are vulnerable to damage from neutrons, and may fail catastrophically if enough damage accumulates that the material no longer superconducts. There is therefore a trade-off between the overall size of the central core, the cross sectional area of the superconducting material (which is related to the maximum current that the superconductor can carry), and the thickness of the shielding.

In order to ensure that the reactor is as compact as possible (which allows greater efficiency), the thickness of shielding should be reduced as much as possible, while still maintaining adequate protection for the other components. Minimising the distance between the plasma and the field coils allows a higher magnetic field in the plasma with a lower current in the coils.

FIG. 2 shows a section of the central column, and illustrates the problems which the shielding material must overcome. The central column (13) comprises a central core of HTS coils (21) and an outer layer of shielding (22). Depending on the material used for the shielding, there may be a layer of oxidised shielding material (23) on the outer surface. There are three major causes of damage which originate from the plasma. Firstly, the high energy neutrons generated by the fusion reaction can essentially knock atoms out of the structure of the shielding, creating damage cascades which propagate through the material. Secondly, the heat flux from the fusion reaction is significant, and can damage the shielding due to thermal stresses induced by uneven heating and the HTS core, as higher temperatures reduces the current that can be carried while maintaining superconductivity, and can cause the coil to suddenly gain resistance, causing the magnet to quench. Lastly, the energetic particles of the plasma will ablate the outer surface of the shielding. This not only causes damage to the shielding itself, but can also contaminate the plasma. It is desirable to have a shielding material which can resist these effects, as well as prevent neutrons from reaching the superconducting coils.

SUMMARY

The challenge of providing shielding in a compact spherical tokamak is addressed in this document by proposing alternative materials which may be used for neutron shielding. The focus will be on shielding for the central column, as this is the most space-critical region of the spherical tokamak, but it is anticipated that the disclosure can be easily adapted for use with other components of the reactor.

According to a first aspect, there is provided neutron shielding for a nuclear fusion reactor, the neutron shielding including a cemented carbide or boride comprising a binder and an aggregate, the aggregate comprising particles of a carbide or boride compound of tungsten, tantalum or hafnium.

According to a further aspect, there is provided a central column for a nuclear fusion reactor, the central column comprising neutron shielding according to the first aspect and a core of superconducting material, wherein the neutron shielding is arranged to protect the superconducting material from heating and damage by neutrons.

According to a still further aspect, there is provided a compact nuclear fusion reactor. The reactor comprises a toroidal plasma chamber and a plasma confinement system arranged to generate a magnetic field for confining a plasma in the plasma chamber. The plasma confinement system is configured so that the major radius of the confined plasma is 1.5 m or less and an aspect ratio of the plasma is 2.5 or less. The neutron shielding used to prevent neutron damage to sensitive components of the reactor is neutron shielding according to the first aspect.

According to a still further aspect, there is provided a divertor for a nuclear fusion reactor, the divertor including a cemented carbide or boride comprising a binder and an aggregate, the aggregate comprising particles of a carbide or boride compound of tungsten, tantalum or hafnium.

According to a still further aspect, there is provided the use of a cemented carbide or boride as neutron shielding for a nuclear fusion reactor, the cemented carbide or boride comprising a binder and an aggregate, the aggregate comprising particles of a carbide or boride compound of tungsten, tantalum or hafnium.

Further aspects and preferred features are set out in the appended claims.

DETAILED DESCRIPTION

Figure 1:
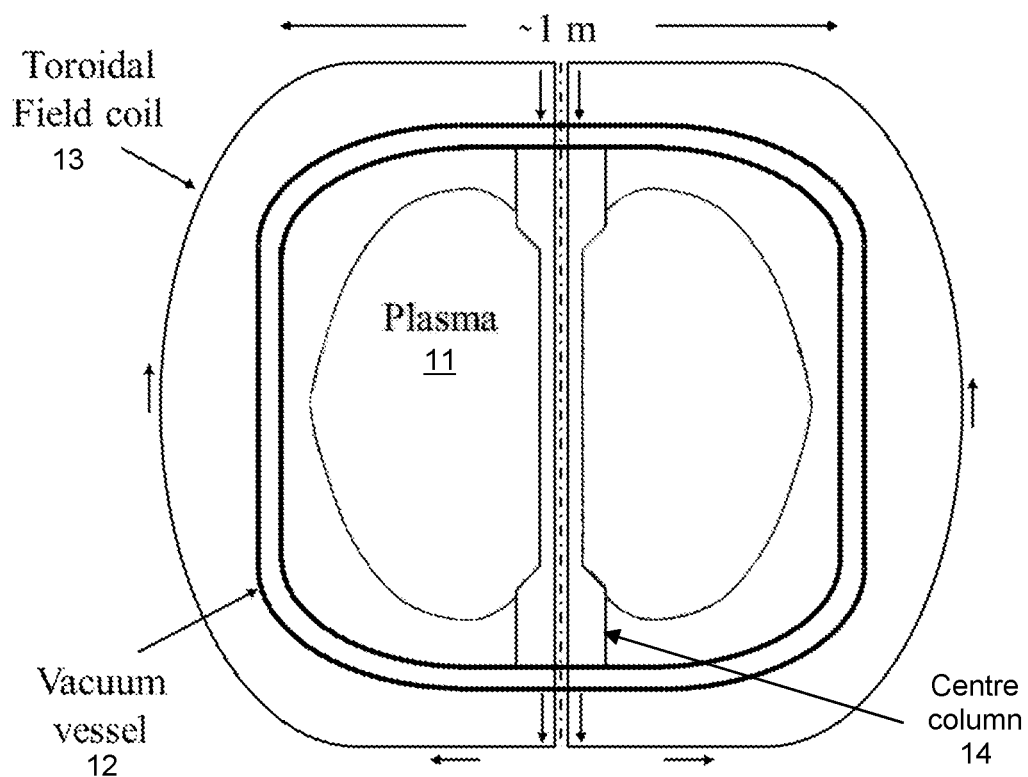
FIG. 1 is a schematic diagram of a spherical tokamak reactor
Figure 2:
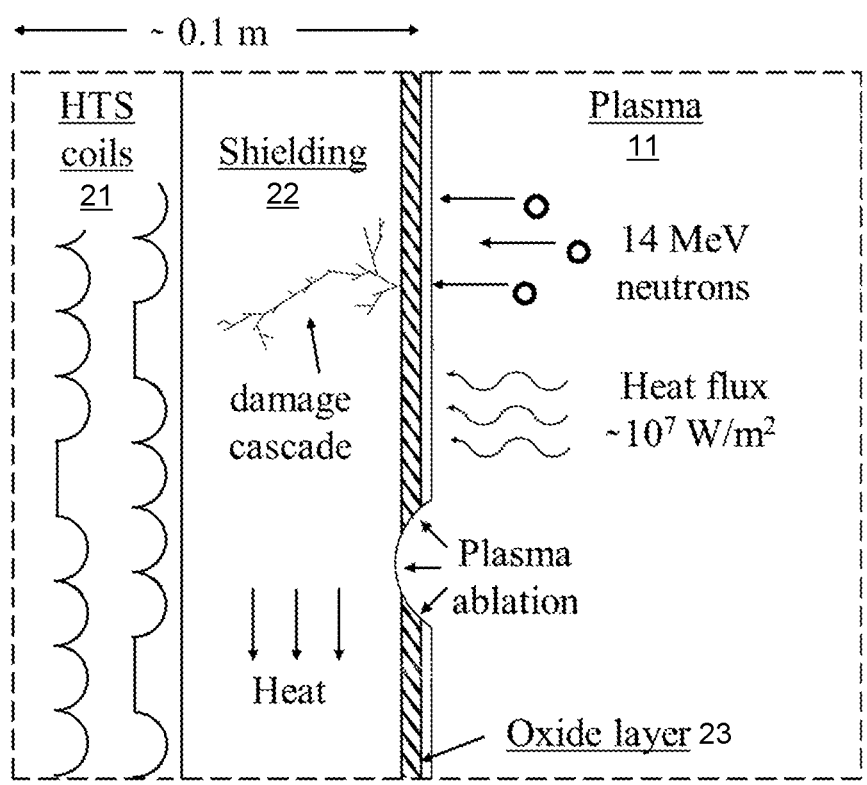
FIG. 2 is a schematic diagram of a section of reactor shielding.

In order to be suitable as for use as shielding in a fusion reactor, a material should be good at absorbing fusion-energy neutrons, resistant to thermal shock, resistant to sputtering and plasma ablation, and resistant to neutron damage. Two classes of materials, the use of which is proposed in this document, which would appear to have all of these properties, are cemented carbides and cemented borides.

Cemented carbides are a metal matrix composite in which particles of a carbide act as the aggregate, and a metallic binder serves as the matrix. Cemented carbides are formed by a sintering process, in which the material is heated to a point where the binder is liquid, but the carbide particles remain solid. The carbide grains are thereby embedded into the liquid binder, which is then allowed to set. This results in a material with superior qualities to either the carbide or the binder taken alone. The ductile binder offsets the natural brittleness of the carbide ceramic, and the carbide particles make the resulting composite much harder than the binder alone. Due to the metal binder, cemented carbides typically have a high thermal conductivity, which reduces the thermal stress experienced by the material due to uneven heating. The coefficient of linear thermal expansion of cemented carbides or borides is typically in the range of 4 to $5\times10^{-6}$. Cemented materials are also resistant to sputtering (ablation of the outer surface of the material by energetic particles). For example, cemented tungsten carbide typically has one quarter of the sputtering rate of pure tungsten.

Cemented borides are equivalent, but using boride particles as the aggregate, rather than carbide. Borocarbide particles may also be used.

The choice of carbide/boride and binder will be guided by the conditions in the reactor. The need to withstand high neutron flux prevents the use of many elements and isotopes, such as cobalt and nickel, which would become radioactive due to neutron exposure. High magnetic fields require structural considerations to be taken into account when using ferromagnetic material, as the resulting forces would cause large stresses within the reactor. Similar considerations occur for the choice of carbide. Also, the material must of course be able to reduce the flux of neutrons which reach components behind the shield. Carbon will naturally act as a moderator, slowing the fission neutrons down, which allows greater freedom of choice in the other elements that may be used (since many more elements are effective absorbers of slow neutrons than faster neutrons). Boron-10 is an effective neutron absorber.

Promising candidates for the carbide are tungsten carbide, as the neutron absorption is favourable and the mechanical properties have been well studied, tungsten boride, and boron carbide, which combines the moderating properties of carbon with the neutron absorption of boron. Multiple carbides may be used in order to balance structural and neutronics properties of the material. In addition, other substances may be added to the cemented material in addition to the carbides, for example borides may be added to a predominantly carbide composite in order to introduce boron into the shielding, or vice versa. Addition of tungsten boride to a cemented tungsten carbide may improve the resistance to corrosion. Borocarbides which may be used include tungsten borocarbide, specifically a ternary tungsten borocarbide. Other substances that may be added to the material include oxides and nitrides, for example titanium nitride may be added to improve the structural properties of the material.

Other alternatives to tungsten carbide or tungsten borocarbide include borides and/or carbides of elements corresponding to the third long row of the periodic table (or beyond). The melting points of the elements increase across the third period, peaking at group six (tungsten). Therefore the main candidate elements are hafnium, tantalum, tungsten and rhenium. The platinum metals may be theoretically suitable for neutron shielding but are considered to be less useful because osmium compounds are highly toxic, and because of the prohibitively high cost of iridium and platinum. Rhenium is also very expensive and very rare. The three most likely candidates are therefore hafnium, tantalum and tungsten. Of these, tungsten (including its compounds) is the cheapest and most widely available, and easy to process by powder methods.

Tantalum has better ductility and toughness than tungsten, is easier to form and join (e.g. by welding), and has better oxidation resistance. However, it is a scarce material and very expensive to buy, and becomes much more radioactive than tungsten when exposed to fusion energy neutron irradiation. The activity decays to below tungsten levels after about a hundred years, but that is an unacceptably long time. Hafnium is also useful. Hafnium diboride is highly refractory, and has very good oxidation resistance. Hafnium is quite rare, but can be obtained as a side product of the production of zirconium for the nuclear industry.

In a spherical tokamak it is important to use a shielding material rich in tungsten (or other element from the third long row of the periodic table, such as hafnium or tantalum) because of the space limitations. This, in turn, creates an acute problem in terms of oxidation and corrosion resistance (because tungsten oxidation is exothermic, and the oxide is volatile). The incorporation of borides (and/or silicides) into a tungsten or tungsten carbide based shield helps address this problem.

The composition of the shielding may be graded, for example the outer (i.e. plasma facing) regions of the shielding may be formulated to improve the resistance to corrosion and ablation, whereas the inner regions may be formulated to improve structural properties or thermal transport. This may be used to improve the efficiency of the shielding, for example by including a higher concentration of neutron moderating material towards the outside (i.e. plasma facing side) of the shielding, and a higher concentration of neutron absorbing material towards the inside of the shielding. In this way, the neutron absorbers are placed where the neutrons will be slowest, and the absorbers will be most effective. Such finely graded structures would be difficult if not impossible to achieve with conventional alloying techniques, and provide a further advantage to the use of cemented materials.

The manufacturing process for cemented carbides or borides allows complex structures to be made relatively easily compared to manufacture from other materials. For example, it would be simple to build shielding with holes through which coolant could be run. Furthermore, cemented carbides or borides may be joined to other materials by a variety of techniques, including brazing and specialised welding methods (e.g. electron beam or laser welding). This provides a considerable advantage when manufacturing the overall reactor systems, e.g. to join the shielding to the main structure of the reactor.

Some aspects of the use of cemented carbides/borides may seem counter-intuitive, but careful study reveals that these aspects do not in fact pose a problem. For example, the metals used for the binder (a promising combination is iron and chromium) have a relatively low melting point compared to other materials used in construction of the reactor, and it is not inconceivable that parts of the shielding will be raise above the melting point. However, if the binder melts, the carbide particles will tend to hold it together until it re-freezes in situ. Even in the extreme case where the binder volatilises on the plasma facing side, the carbide will form a solid shell, which will maintain the structure of the shielding (though the thermal performance may be impacted on the outer layers).

Furthermore, it may seem that the use of powdered carbide/boride would not produce a uniform enough substance for the neutronics to be favourable. However, provided the mean free path of the neutrons is substantially greater than the diameter of any individual particle in the cemented material then the powder blend will act identically to a "true" alloy. The mean free path of the neutrons is one or two orders of magnitude greater than the particle sizes which are used for cemented carbides.

Cemented carbides or borides may also be used in other regions of the reactor, e.g. the divertor, where they provide similar advantages.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A tokamak nuclear fusion reactor comprising:
   a toroidal plasma chamber;
   a plasma confinement system arranged to generate a magnetic field for confining a plasma in an interior of the plasma chamber; and
   neutron shielding arranged between the interior of the toroidal plasma chamber and the plasma confinement system, the neutron shielding including a cemented carbide or boride comprising a binder and an aggregate, the aggregate comprising particles of a carbide or boride compound of tungsten, tantalum and/or hafnium;
   wherein a plasma-facing side of the cemented carbide or boride comprises a lower proportion of neutron absorbing material than a non-plasma facing side of the cemented carbide or boride; and
   wherein the cemented carbide or boride does not comprise cobalt or nickel.

2. The tokamak nuclear fusion reactor according to claim 1, wherein the binder comprises a metal.

3. The tokamak nuclear fusion reactor according to claim 1, wherein the carbide or boride compound is one or more of:
   tungsten carbide;
   tungsten boride;
   a ternary tungsten borocarbide.

4. The tokamak nuclear fusion reactor according to claim 2, wherein the binder comprises iron and/or chromium.

* * * * *